US006542922B1

(12) United States Patent
Chessell et al.

(10) Patent No.: US 6,542,922 B1
(45) Date of Patent: Apr. 1, 2003

(54) CLIENT/SERVER TRANSACTION DATA PROCESSING SYSTEM WITH AUTOMATIC DISTRIBUTED COORDINATOR SET UP INTO A LINEAR CHAIN FOR USE OF LINEAR COMMIT OPTIMIZATION

(75) Inventors: Amanda Elizabeth Chessell, Alton (GB); Gordon Douglas Hutchison, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/339,378

(22) Filed: Jun. 25, 1999

(30) Foreign Application Priority Data

Feb. 20, 1999 (GB) .............................................. 9903850

(51) Int. Cl.[7] .............................................. G06F 15/16
(52) U.S. Cl. ........................ 709/203; 709/201; 709/202; 709/223; 370/330; 707/100; 707/102
(58) Field of Search ................................ 709/101, 105, 709/201–202, 217, 223, 315, 332, 203; 707/100, 102; 370/330

(56) References Cited

U.S. PATENT DOCUMENTS

| | | | |
|---|---|---|---|
| 4,191,657 A | 3/1980 | Ludwig et al. | ............. 395/325 |
| 4,777,595 A | 10/1988 | Strecker et al. | ............. 364/200 |
| 5,390,308 A | 2/1995 | Ware et al. | ................... 395/400 |
| 5,499,385 A | 3/1996 | Farmwald et al. | .......... 395/823 |

(List continued on next page.)

FOREIGN PATENT DOCUMENTS

GB  2 301 909  12/1996

OTHER PUBLICATIONS

IBM Technical Disclosure Bulletin, Dec. 1991, v34, n7B, pp. 334–338, "Combining presumed abort two phase commit protocols with SNA's last agent optimization".

*Primary Examiner*—Ayaz Sheikh
*Assistant Examiner*—Thu Ha Nguyen
(74) *Attorney, Agent, or Firm*—A. Bruce Clay

(57) ABSTRACT

A computing apparatus for use in a client/server transaction processing system, the apparatus has: a sending means for sending a transactional request to a server data processing apparatus to request that the server data processing apparatus become involved in processing a distributed transaction, the transactional request including an indication of a computing apparatus to which the server data processing apparatus should direct a registration request to request that a resource local to the server data processing apparatus be registered in the transaction; a receiving means for receiving a reply to the transactional request from the server data processing apparatus, the reply including an indication of an apparatus which is currently the last in a linear chain of apparatuses that have sent out registration requests in response to receiving transactional requests; and a keeping means for keeping track of the current apparatus which is the last in the linear chain based on replies received by the receiving means; wherein the indication sent to a server data processing apparatus by the sending means, along with the transactional request, is an indication of the current apparatus which is the last in the linear chain, based on the keeping means.

12 Claims, 4 Drawing Sheets

U.S. PATENT DOCUMENTS

| | | | |
|---|---|---|---|
| 5,555,381 A | 9/1996 | Ludwig et al. | 395/281 |
| 5,598,580 A | 1/1997 | Detschel et al. | 395/855 |
| 5,606,717 A | 2/1997 | Farmwald et al. | 395/856 |
| 5,646,941 A | 7/1997 | Nishimura et al. | 370/389 |
| 5,754,537 A * | 5/1998 | Jamal | 370/330 |
| 5,790,789 A * | 8/1998 | Suarez | 709/202 |
| 5,809,263 A | 9/1998 | Farmwald et al. | 395/309 |
| 5,857,098 A | 1/1999 | Talcott et al. | 395/587 |
| 5,872,969 A * | 2/1999 | Copeland et al. | 709/101 |
| 5,872,996 A | 2/1999 | Barth et al. | 395/853 |
| 5,890,186 A | 3/1999 | Sato et al. | 711/3 |
| 5,905,876 A | 5/1999 | Pawlowski et al. | 395/292 |
| 5,920,883 A | 7/1999 | Tamaki et al. | 711/101 |
| 5,924,125 A | 7/1999 | Arya | 711/205 |
| 6,038,589 A * | 3/2000 | Holdsworth et al. | 709/201 |
| 6,125,363 A * | 9/2000 | Buzzeo et al. | 707/100 |
| 6,209,018 B1 * | 3/2001 | Ben-Shachar et al. | 709/105 |
| 6,253,252 B1 * | 6/2001 | Schofield | 709/315 |
| 6,260,078 B1 * | 7/2001 | Fowlow | 709/332 |
| 6,292,827 B1 * | 9/2001 | Raz | 709/217 |
| 6,298,352 B1 * | 10/2001 | Kannan et al. | 707/102 |
| 6,301,601 B1 * | 10/2001 | Helland et al. | 709/101 |
| 6,317,773 B1 * | 11/2001 | Cobb et al. | 709/101 |
| 6,330,601 B1 * | 12/2001 | French et al. | 709/223 |

* cited by examiner

CLIENT/SERVER TRANSACTION DATA PROCESSING SYSTEM WITH AUTOMATIC DISTRIBUTED COORDINATOR SET UP INTO A LINEAR CHAIN FOR USE OF LINEAR COMMIT OPTIMIZATION

FIELD OF THE INVENTION

The invention relates to the field of client/server (also known as "distributed") computing, where one computing device ("the client") requests another computing device ("the server") to perform part of the client's work. The client and server can also be both located on the same physical computing device.

BACKGROUND OF THE INVENTION

Client/server computing has become more and more important over the past few years in the information technology world. This type of distributed computing allows one machine to delegate some of its work to another machine that might be, for example, better suited to perform that work. For example, the server could be a high-powered computer running a database program managing the storage of a vast amount of data while the client is simply a desktop personal computer (PC) which requests information from the database to use in one of its local programs.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 arid European Patent Published Application No. EP 0 677.943 A2. These latter two publications are hereby incorporated by reference. However, an example of the basic architecture will be given below for contextual understanding of the invention's environment.

As shown in FIG. 1, the client computer 10 (which could, for example, be a personal computer having the IBM OS/2 operating system installed thereon) has an application program 40 running on its operating system ("IBM" and "OS/2" are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object at the server, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110.

Using the above technique, the client application program 40 is :not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms with distributed objects as is shown in FIG. 1. The OMG has set forth published standards by which client computers (e.g. 10) communicate (in OOP form) with server machines (e.g. 20). As part of these standards, an Object Request Broker (called CORBA-the Common Object Request Broker Architecture) has been defined, which provides the object-oriented bridge between the client and the server machines. The ORB decouples the client and server applications from the object oriented implementation details, performing at least part of the work of the first and second logic means 50 and 90 as well as the connection means 80.

As part of the CORBA software structure, the OMG has set forth standards related to "transactions" and these standards are known as the OTS or Object Transaction Service. See, e.g., CORBA Object Transaction Service Specification 1.0, OMG Document 94.8.4. Computer implemented transaction processing systems are used for critical business tasks in a number of industries. A transaction defines a single unit of work that must either be fully completed or fully purged without action. For example, in the case of a bank automated teller machine from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, a transaction affects resources managed at the local automated teller device as well as bank balances managed by a bank's main computer. Such transactions involve one particular client computer (e.g., 10) communicating with one particular server computer (e.g., 20) over a series of client requests which are processed by the server. The OMG's OTS is responsible for coordinating these distributed transactions.

An application running on a client process begins a transaction which may involve calling a plurality of different servers, each of which will initiate a server process to make changes to its local data according to the instructions contained in the transaction. The transaction finishes by either committing the transaction (and thus all servers finalize the changes to their local data) or aborting the transaction (and thus all servers "rollback" or ignore the changes to their local data made during the transaction). To communicate with the servers during the transaction (e.g., instructing them to either commit or abort their part in the transaction) one of the processes involved must maintain state data for the transaction. According to the OTS standard, this involves the process setting up a series of objects, one of which is a coordinator object which coordinates the transaction with respect to the various servers.

The main purpose of this coordinator object is to keep track of which server objects are involved in the transaction, so that when the transaction is finished, each server object involved in the transaction can be told to commit the changes made locally to the local database associated with that server object, in a single unified effort. This ensures that no server object makes a data change final without the other server objects which are also involved in the same transaction doing so. Thus, each server object which is to join a transaction must first register with the coordinator object so that the coordinator object will know of the server object's existence, its wish to join the transaction, and where to find the server object (e.g., which server machine the server object resides on) when it comes time to complete the transaction (where the coordinator object instructs all server objects to make the changes to their respective local data final).

A server object responsible for updating data (referred to hereinbelow as a resource object) gets involved in a transaction when another server object (or the original client object which started the transaction) sends a request to the resource object for the resource object to do some work. This latter request carries some information, called the transaction context, to inform the resource object that the request is part of a particular transaction. With CORBA version 2, the transaction context is built by the local CosTransactions::Coordinator object get_txcontext method. Once a resource object finds out that it is to be involved in a particular transaction, it then makes a registration request with the coordinator object.

When the resource object is located in a different operating system process from the coordinator object, it has been found to be useful to use a subordinate coordinator object (222 in FIG. 2) located in the same operating system process as the resource object (223 or 224). The main coordinator object is then called the "superior coordinator object" 211. During registration of a resource object 223 to the transaction, the subordinate coordinator 222 is set up locally inside the server machine 22 which houses the resource object 223 and the resource object 223 communicates directly with this subordinate coordinator object 222 when it makes a registration request. (It should be noted that while the term "server machine" is used here, the term "server process" could also be used, to thus indicate that the distributed server objects could, in fact, be located on the same server machine but on different operating system processes running on the server machine, and hereinafter the term "server" will be used to refer to both terms.) The subordinate coordinator 222, in turn, registers itself with the superior coordinator object 211 (which is located in another process possibly on another server machine as if it were a resource object).

The subordinate coordinator object 222 thus provides a representation of the existence of the transaction within the server housing the resource object. Instead of communicating directly with the superior coordinator object 211, the resource objects 223 and 224 first communicate with their local subordinate coordinator object 222 which in turn communicates with the superior coordinator object. This greatly reduces the number of cross-operating-system-process calls.

Oftentimes, a transaction will involve a number of different processes, each potentially running on a different server machine. For example, server process 21 (which includes superior coordinator 211) may call three different processes to take part in a distributed transaction, and thus each of such processes would result in the creation of a subordinate coordinator to locally coordinate the transaction in that process. At the end of the transaction, the superior coordinator would use the traditional two-phase commit protocol to make sure that each of the three processes makes its changes final in a unitary "all or nothing" fashion (i.e., either they all commit their changes or they all roll back their changes). The two phase commit protocol traditionally involves sending a prepare call to each of the three subordinate coordinators and then sending a commit call to each of the three subordinate coordinators, assuming that they have all voted to commit in response to the prepare call. This would, thus, involve the superior coordinator 211 sending six cross-process calls.

A well known optimization of the two phase commit protocol, which is often used to reduce the number of total cross process calls in the two phase commit, is known as the "last agent optimization" (e.g., see *Transaction Processing: Processes and Techniques* by Gray and Reuter, Morgan Kaufman Publishers, September 1992, Section 12.5.3). To summarise this optimisation, if a transaction root coordinator (e.g., superior coordinator 211) has N resources (e.g., representing 3 subordinate coordinators) involved in a transaction it will prepare (i.e., send prepare flows to) N−1 of them. At this point if all the resources vote commit (the usual case) the transaction outcome depends only on the last resource's prepare vote. We can therefore combine the prepare and commit flows to the last resource, this optimised final flow is catered for in the CORBA CosTransactions specification by the resource::commit_one phase method. In this discussion, subordinate coordinators, their resources, and other resources can be treated the same way and are generically termed the 'agents' involved. With the last agent optimization, the message flows are halved between the coordinator and the last agent over the simple case for two phase commit.

A further well known optimization of the two-phase commit protocol is called the "linear commit" optimization (also described in the above cited Gray et al section). The linear commit optimization is based on the idea that if we can arrange the systems involved in a distributed transaction into a linear chain, we can then repeatedly use the last agent optimization on this chain. This approximately halves the total number of messages that must be passed between the distributed systems that are taking place in the distributed transaction completion.

However, while these optimizations are well known in the transaction processing art, it is heretofore unknown in the context of client/server distributed transaction processing how to arrange the coordinators into such a linear chain in an automatic reliable fashion, and this deficiency in the prior art has been the stimulus which has led the present inventors to come up with the present invention which will be described below.

SUMMARY OF THE INVENTION

According to a first aspect, the present invention provides a computing apparatus for use in a client/server transaction processing system, the apparatus comprising: sending means for sending a transactional request to a server data processing apparatus to request that the server data processing apparatus become involved in processing a distributed transaction, the transactional request including an indication of a computing apparatus which the server data processing apparatus should direct a registration request to request that a resource local to the server data processing apparatus be registered in the transaction; receiving means for receiving a reply to the transactional request from the server data processing apparatus, the reply including an indication of an apparatus which is currently the last in a linear chain of apparatuses that have sent out registration requests in response to receiving transactional requests; and keeping means for keeping track of the current apparatus which is the last in the linear chain based on replies received by the receiving means; wherein the indication sent to a server data processing apparatus by the sending means, along with the transactional request, is an indication of the current apparatus which is the last in the linear chain, based on said keeping means.

According to a second aspect, the invention provides a method of operating the apparatus of the first aspect.

According to a third aspect, the invention provides a program storage device readable by a machine, tangibly embodying a program of instructions executable by the machine to perform the method steps of the second aspect.

Thus, the invention enables the coordinators in a distributed transaction to line up in a linear chain in an automatic and reliable fashion, thus allowing the use of the linear commit optimization. Since the linear commit optimization can then be used, the number of inter-coordinator message flows during the two-phase commit process can be cut in half. As present and future object-oriented electronic commerce applications make substantial use of distributed transactions (because databases necessary to the transaction are held in various servers), the present invention will have a real and tangible benefit to such systems in terms of cutting down significantly on inter-system traffic.

BRIEF DESCRIPTION OF THE DRAWINGS

The invention will be better understood by the below description of preferred embodiments thereof to be read while referring to the following figures.

DETAILED DESCRIPTION OF THE PREFERRED EMBODIMENTS

Figure 1:
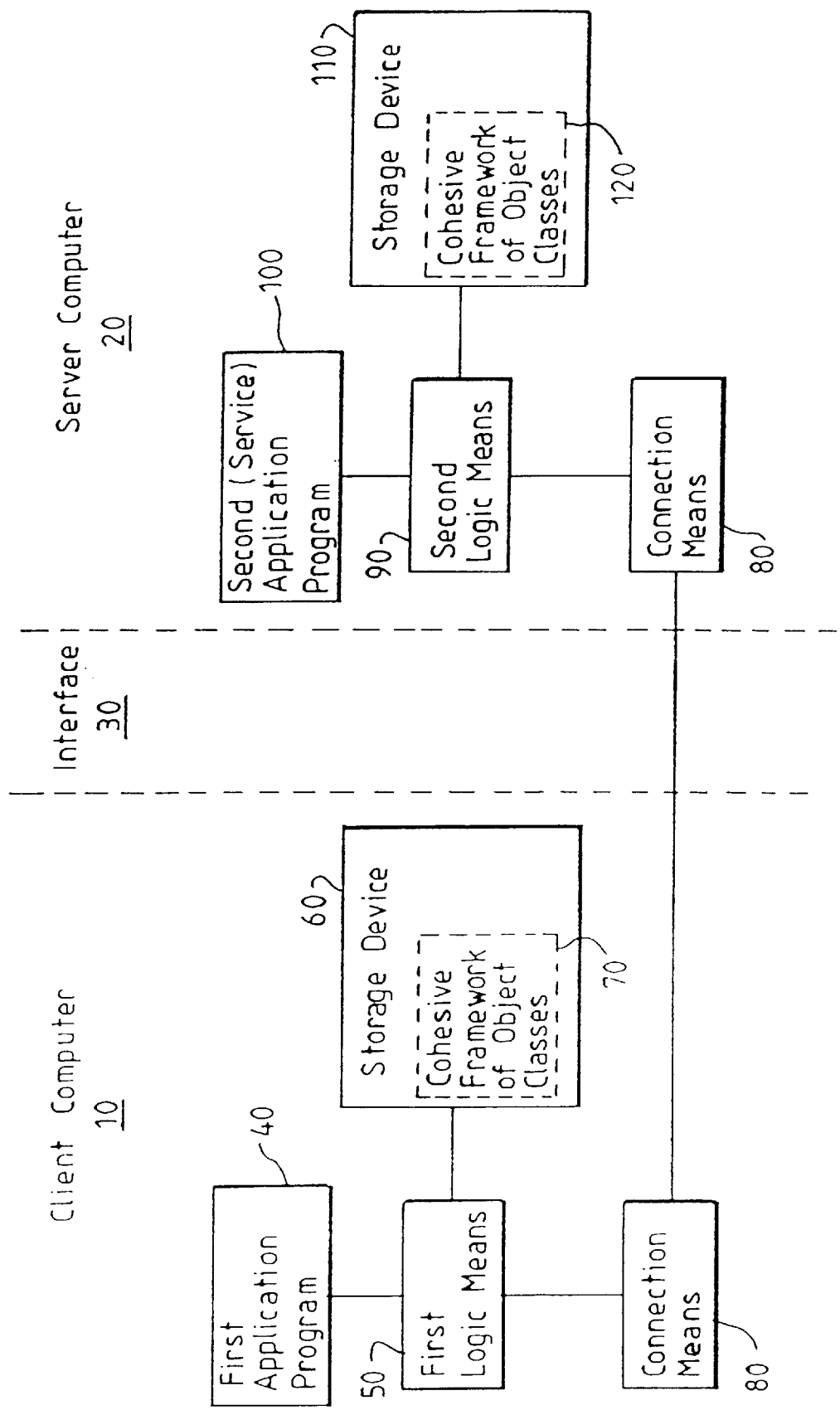
FIG. 1 is a block diagram of a well-known heterogeneous client/server architecture using object technology, in the context of which preferred embodiments of the present invention can be applied.
Figure 2:
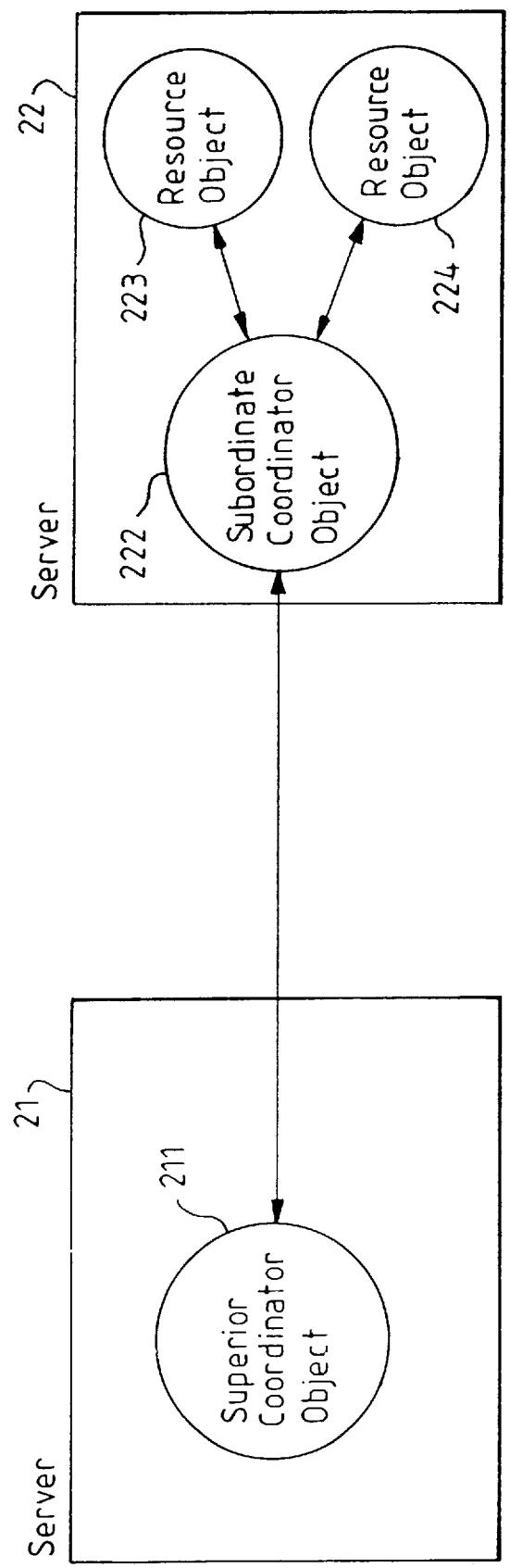
FIG. 2 is a block diagram showing the various objects instantiated within two co-transactional servers according to a conventional system.
Figure 3:
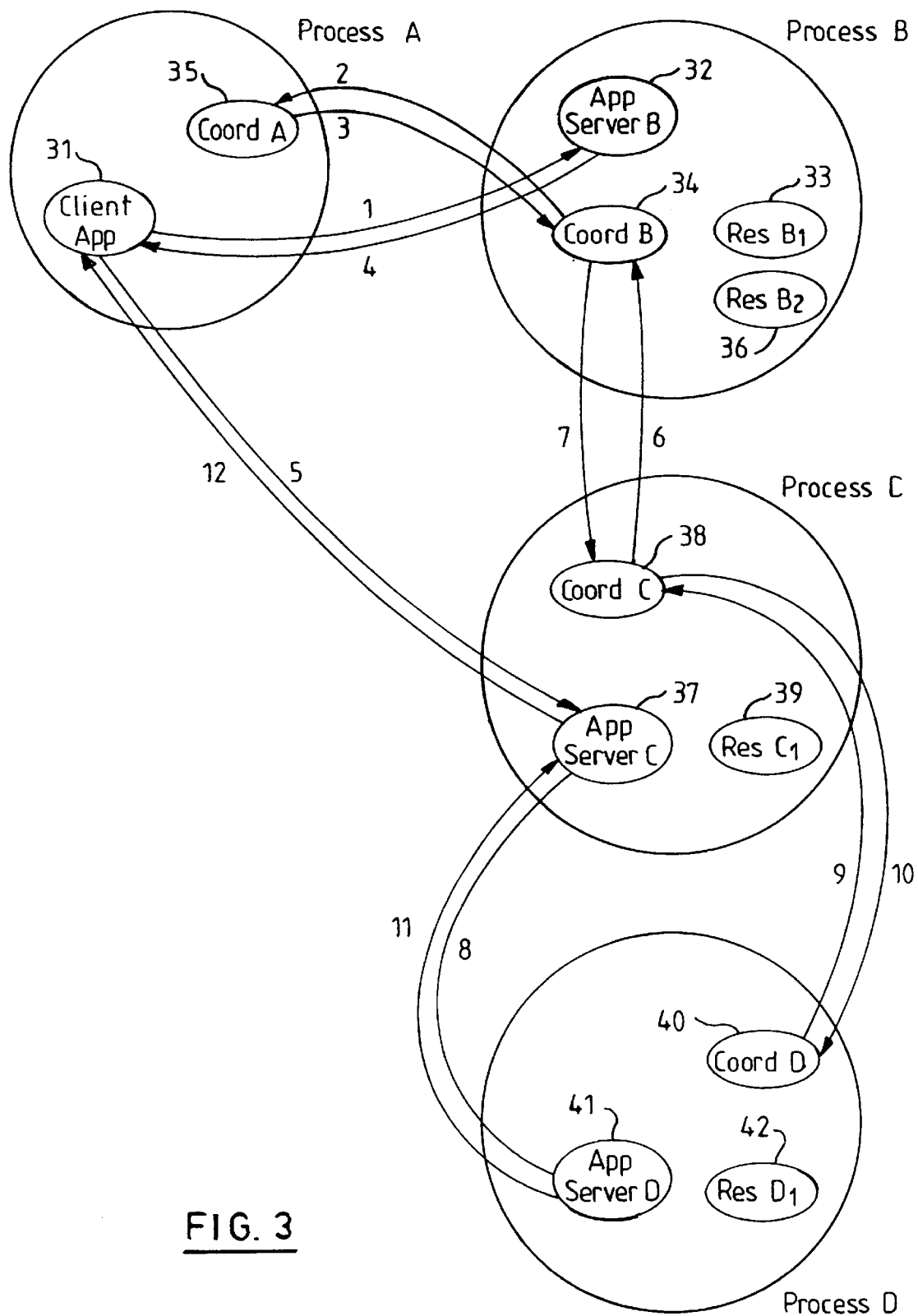
FIG. 3 is a block diagram showing software components according to a preferred embodiment of the present invention.

An example scenario will now be presented in order to illustrate how a preferred embodiment of the present invention operates, in conjunction with FIG. 3. This example scenario has been chosen for being fairly typical of how a distributed transaction is carried out.

In the example we have a distributed transaction running across 4 systems. (Here a system can be taken to be a discrete operating system process possibly running on its own dedicated machine (with each machine in communication with the other machines via a network, such as the Internet), or all of the processes could be running on the same physical machine without compromising the example.)

A client application 31 is sited on system A and, while running a user's transactional unit of work, the client application 31 makes use of server applications hosted on the three server systems: ServerB; ServerC and ServerD.

For each server system the user's transaction involves, recoverable resources are accessed as part of the distributed transaction and this requires that the server systems become involved in the transaction and the transaction's distributed two phase commit process. The scenario as the transaction develops will be described below.

During the development of the transaction, the preferred embodiment of the invention requires that at all times the developing 'new' parts of the distributed transaction tree become located at the 'end' of the current transaction 'chain' being built. This results in the transaction tree becoming linear (in terms of the coordinators involved) thus improving the potential of the 'linear commit' optimisation.

The user runs the client application 31 'CLIENT APP' in system 'A', and while this application is performing a transactional unit of work on behalf of the user the application code makes a call (flow '1' in FIG. 3) to a server application 'APP SERVER B' situated on System 'B'.

When this call is made system B's transaction service establishes the transaction on system B (the destination system) on behalf of the application. This is done using the 'transaction context' that is flowed along with the application's request. This establishment of the transaction context is done similarly at the destination system on receipt of all application flows (e.g. flows '1'. '5', and '8' in our scenario) targeted at transactional objects.

While running the server application B 32 a resource 'ResB1' 33 is registered by the application 32 with the local coordinator 'CoordB' 34. As 'CoordB' 34 is not yet registered to be involved in the distributed transaction completion it makes it's own register_resource call (flow '2') to the Coordinator Reference that was present in the transaction context currently established ('CoordA' 35). Thus, 'CoordB'

34 is now linked to the distributed transaction coordinated by 'CoordA' 35. Thus 'CoordA' 35, having completed processing of the register_resource flow returns and control is returned (flow '3') to the calling system ('B').

Processing continues in system B, and another resource 36 ('ResB2') is registered into the transaction by a part of the server application B 32. As 'CoordB' 34 is already involved in the transaction no new register_resource flow (such as '2','3') is needed.

Processing of the user's server work completes on system 'B' and 'B' returns control to system A (flow '4'). Piggybacked to this flow is a reference to the coordinator that the returning system (system B) now believes is at the 'end' of the distributed transaction chain of involved coordinators—in this case a reference to 'CoordB', this reference is stored in the returning 'transaction context'

As the next step in the transaction, the client application 31 calls 'APP SERVER C 37' (flow '5') in system C. In the prior art technique, system A passed a reference to system A's coordinator 35 (this reference flows in the transaction context piggy backed to flow '5'), so that system C would know that when it is registering a local (to system C) resource into the transaction, system C should make the register request to the main coordinator 35 in system A. However, in the preferred embodiment of the present invention, at flow '5' in this scenario (example) system A passes a reference to the coordinator (i.e. to 'CoordB' 34) that 'CoordA' 35 currently believes is at the end of the 'chain'.

Thus when the transaction service for server 'C' becomes involved in the transaction, instead of contacting 'CoordA' to become joined to the distributed transaction (as was done in the prior art) (thus forming a V shaped transaction tree) it will contact 'CoordB', 34 forming a linear chain which can be more efficiently committed using two phase commit with the linear commit optimisation technique.

Thus 'CoordC', 38 flows a register_resource flow (to register system C's local resource ResC1 39 into the transaction) to 'CoordB' 34 (flow '6') as CoordB 34 was the coordinator reference passed to system C in the transaction context from system A. This flow is similar to flow '2' and uses the same apparatus. 'CoordB' 34 returns (return flow '7') and processing continues on system C.

We now have a chain of involved systems 'A'->'B'->'C' with control (i.e. the active application thread) now currently in node 'C'. We can see that as long as the transaction service for the currently running/active portion of the transaction is aware of the current 'last' coordinator in the chain and flows a reference to this 'last' coordinator with any outbound transactional flows and returns this (or the updated) reference on any replies—the transaction will always track the 'last' system (involved via an inter-system register_resource) in the chain and upon sending this reference (and updating it as above) on any subsequent new inter-system transactional flows the distributed transaction tree will form a linear chain of coordinators as desired.

As in our scenario 'CoordC' 38 is currently last in the chain, when transactional work is flowed to server application D 41 in system 'D' (flow '8'), CoordC's reference is passed in the transaction context in this flow. 'CoordD' 40 becomes involved in the transaction via a register_resource flow (to register its local resource ResD1 42) to the current 'last' coordinator (CoordC 38) via flow '9' and return flow '10'. In our scenario work flows from system C to D (flow '8') and returns back to system 'C' (return flow '11') and then back finally to system A (flow '12'). Thus, the coordinators are lined up in a linear chain A-->B-->C-->D, as desired.

In another scenario system 'D' could have become involved in the transaction due to work flowing from any of the systems 'A', 'B' and 'C' and once any of these three systems becomes involved in the distributed transaction tree in the linear chain 'A'->'B'->'C' then any transactional flows to D from any of 'A', 'B' or 'C' will pass a reference to 'CoordC' 38 piggy-backed with the transaction context.

Figure 4:
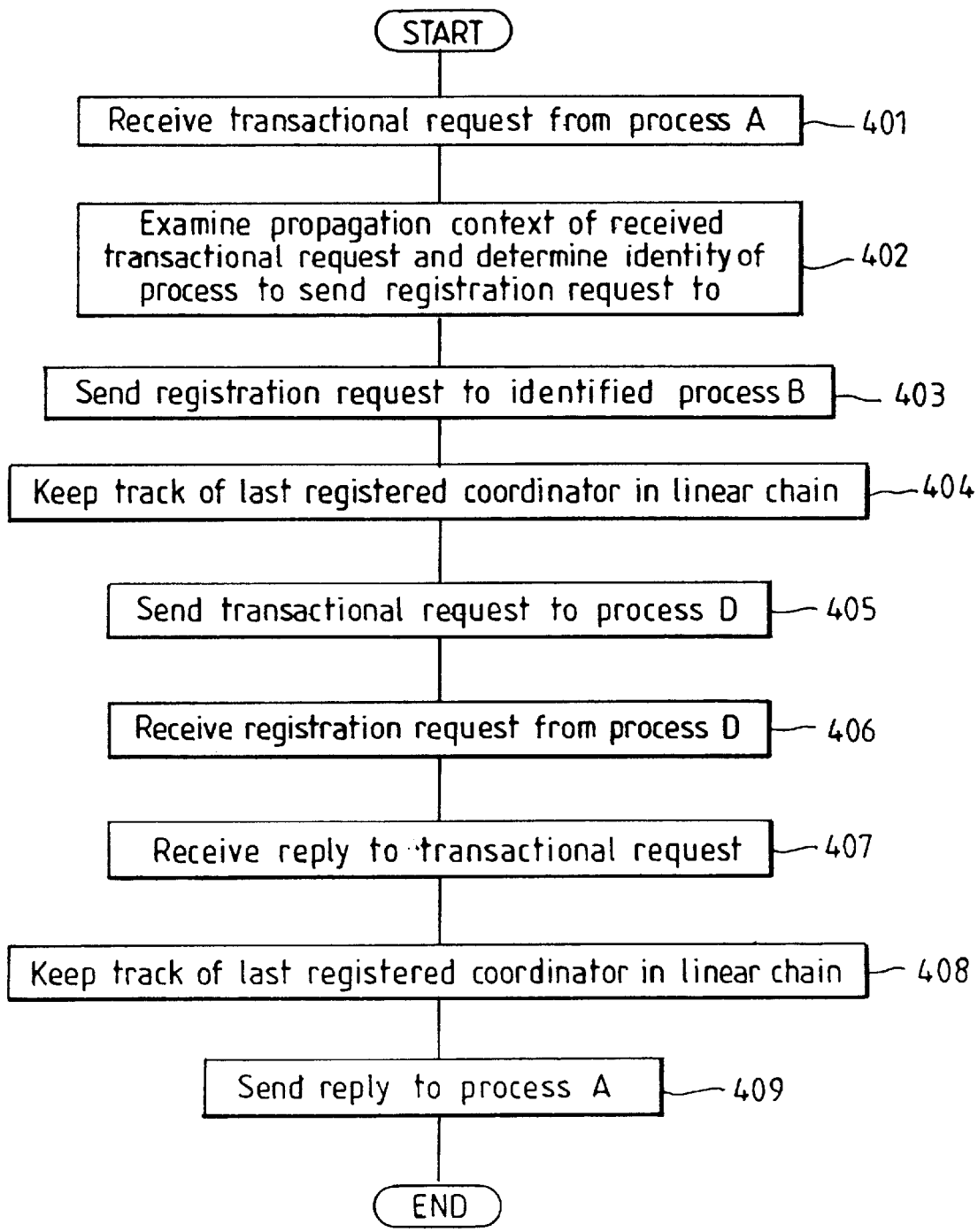
FIG. 4 is a flowchart showing the steps carried out by a process according to a preferred embodiment of the present invention.

The steps carried out by a process according to a preferred embodiment of the present invention will now be described with reference to the flowchart of FIG. 4. For illustrative purposes, process C in FIG. 3 will be the representative process described with respect to the flowchart of FIG. 4.

At step 401, server application C 37 in process C receives a transactional request (flow 5 in FIG. 3) from client application 31, requesting that process C become involved in a distributed transaction. Included in the propagation context of the received transactional request is an indication that when process C sends out a registration request to register its local resource ResC1 39 in the transaction, process C should send this registration request to CoordB 34 in process B (because process B had previously informed process A that process B was the last coordinator in the linear chain).

At step 402, process C examines the propagation context of the received transactional request and determines the identity of the process in which process C should send a registration request to. As explained in the last paragraph, in our scenario of FIG. 3 the process to send registration requests to is process B. Thus, at step 403, process c sends a registration request (flow 6) to CoordB 34 of process B. Now that CoordC 38 of process C has sent a registration request to process B, CoordC of process C now replaces CoordB of process B as the last coordinator in the linear chain of registered coordinators in the transaction. Thus, at step 404, process C keeps track of the last registered coordinator in the linear chain by, for example, deleting a memory location which previously stored an indication that CoordB of process B was the last coordinator in the linear chain and inserting in that memory location an indication that Coord C of process C is now the last coordinator in the linear chain of registered coordinators.

At step 405, process C sends (flow 8) a transactional request to process D to request that process D become involved in the distributed transaction (note that process C calls process D as a part of the execution of the transactional request which client application 31 has sent (via flow 5) to server application C). Included in the propagation context of the transactional request is an indication that when process D sends out a registration request to register its Local resource ResD1 42 in the transaction, process D should send this registration request to CoordC 38 in process C (because process C, as explained in the previous paragraph has substituted itself in place of process B as the last coordinator in the linear chain).

At step 406, process C receives a registration request (flow 9) from process D requesting that process D's local resource ResD1 42 be registered with the transaction. Process C then sends (step 407) a reply (flow 10) to the registration request back to process D.

At step 407, once process D is finished performing its part of the transactional work, process C receives a reply (flow 11) from process D to the transactional request (flow 8) that process C sent to process D at step 405. This latter reply (flow 1) includes an indication that process D is now the last registered coordinator in the linear chain (since process D has sent a registration request to process C (flow 9). At step

408, process C then keeps track of the last registered coordinator in the linear chain by, for example, deleting the memory location which previously stored an indication that CoordC of process C was the last coordinator in the linear chain and inserting in that memory location an indication chat Coord D of process D is now the last coordinator in the linear chain of registered coordinators.

At step 409, when process C has completed its processing of the transactional request that was received at step 401, process C sends a reply (flow 12) to the transactional request back to the client application 31 of process A. Included in the propagation transaction context of this reply is an indication that process D is now the last coordinator in the linear chain of registered coordinators. Upon receiving this reply, process A then updates its own record or the last coordinator in the linear chain (because process A currently stores process B as the last coordinator). This way, should client application 31 send a transactional request to a further server E (not shown in FIG. 3), client application 31 will tell server E that when server E registers with the transaction, server E should send its registration request to process D (which will then place server E at the end of the linear chain of registered processes).

Although the preferred embodiment of the invention has been described in the object-oriented programming environment, the invention can also be applied to non-object-oriented programming environments.

In the attached claims, the term "apparatus" can be either a machine or a process running on a machine.

We claim:

1. A computing apparatus for use in a client/server transaction processing system, the apparatus comprising:

sending means for sending a transactional request to a server data processing apparatus to request that the server data processing apparatus become involved in processing a distributed transaction, the transactional request including an indication of a computing apparatus to which the server data processing apparatus should direct a registration request to request that a resource local to the server data processing apparatus be registered in the transaction;

receiving means for receiving a reply to the transactional request from the server data processing apparatus, the reply including an indication of an apparatus which is currently the last in a linear chain of apparatuses that have sent out registration requests in response to receiving transactional requests; and keeping means for keeping track of the current apparatus which is the last in the linear chain based on replies received by the receiving means;

wherein the indication sent to a server data processing apparatus by the sending means, along with the transactional request, is an indication of the current apparatus which is the last in the linear chain, based on said keeping means.

2. The apparatus of claim 1, wherein said indication is provided in a reply as part of a transaction propagation context.

3. The apparatus of claim 1, wherein said apparatus is implemented according to the Common Object Request Broker Object Transaction Service specification.

4. The apparatus of claim 1 wherein said client/server system uses the Internet as a communication medium.

5. A method of operating a computing apparatus for use in a client/server transaction processing system, the method comprising steps of:

sending a transactional request to a server data processing apparatus to request that the server data processing apparatus become involved in processing a distributed transaction, the transactional request including an indication of a computing apparatus to which the server data processing apparatus should direct a registration request to request that a resource local to the server data processing apparatus be registered in the transaction;

receiving a reply on the transactional request from the server data processing apparatus, the reply including an indication of an apparatus which is currently the last in a linear chain of apparatuses that have sent out registration requests in response to receiving transactional requests; and keeping track of the current apparatus which is the last in the linear chain based on replies received via the receiving step;

wherein the indication sent to a server data processing apparatus via the sending step, along with the transactional request, is an indication of the current apparatus which is the last in the linear chain, based on the keeping step.

6. The method of claim 5, wherein said indication is provided in a reply as part of a transaction propagation context.

7. The method of claim 5, wherein said apparatus is implemented according to the Common Object Request Broker Object Transaction Service specification.

8. The method of claim 5 wherein said client/server system uses the Internet as a communication medium.

9. A program storage device readable by a machine, tangibly embodying a program of instructions executable by the machine to perform the method steps of claim 5.

10. The program storage device of claim 9, wherein said indication is provided in a reply as part of a transaction propagation context.

11. The program storage device of claim 9, wherein said apparatus is implemented according to the Common Object Request Broker Object Transaction Service specification.

12. The program storage device of claim 9 wherein said client/server system uses the Internet as a communication medium.

\* \* \* \* \*